US009146150B2

(12) United States Patent
van den Berg et al.

(10) Patent No.: US 9,146,150 B2
(45) Date of Patent: Sep. 29, 2015

(54) WEIGHING METHOD AND APPARATUS FOR MEAT PROCESSING SYSTEMS

(71) Applicant: Foodmate B.V., Oud-Beijerland (NL)

(72) Inventors: Juul Floris van den Berg, Oud-Beijerland (NL); Mark Thomas Gustaaf den Boer, Oud-Beijerland (NL); Jacobus Eliza Hazenbroek, Klaaswaal (NL)

(73) Assignee: Foodmate BV (NL)

( * ) Notice: Subject to any disclaimer, the term of this patent is extended or adjusted under 35 U.S.C. 154(b) by 183 days.

(21) Appl. No.: 13/804,241

(22) Filed: Mar. 14, 2013

(65) Prior Publication Data

US 2013/0333956 A1    Dec. 19, 2013

(30) Foreign Application Priority Data

Jun. 19, 2012 (NL) ..................................... 2009033

(51) Int. Cl.
G01G 19/00 (2006.01)
G01G 19/06 (2006.01)
(Continued)

(52) U.S. Cl.
CPC ............ *G01G 23/10* (2013.01); *A22C 21/0053* (2013.01); *B07C 5/28* (2013.01); *G01G 11/04* (2013.01); *G01G 15/00* (2013.01);
(Continued)

(58) Field of Classification Search
CPC .......... B07C 5/28; B07C 5/18; B65G 47/846; B65G 47/847; B65G 47/842; A22C 21/0046; A22C 21/0053; A22C 18/00; G01G 15/00; G01G 11/00; G01G 11/02; G01G 11/04; G01G 19/06; G01G 21/10
USPC ....................................................... 177/145
See application file for complete search history.

(56) References Cited

U.S. PATENT DOCUMENTS 3,552,511 A * 1/1971 Marcheso et al. ................ 177/1
3,918,587 A * 11/1975 Drew, Jr. ....................... 209/593
(Continued)

FOREIGN PATENT DOCUMENTS

EP    0 736 255 A1    10/1996
EP    0 786 208 A1    7/1997
(Continued)

OTHER PUBLICATIONS

European Search Report—NL 2004574, Publication Date Jan. 3, 2011, Foodmate B.V.
(Continued)

*Primary Examiner* — Randy W Gibson
(74) *Attorney, Agent, or Firm* — Womble Carlyle Sandridge & Rice LLP

(57) ABSTRACT

Disclosed are a method of, as well as an apparatus for, weighing items of poultry, such as poultry or chicken carcasses, in conjunction with a meat processing systems (5, 7). The method includes: a first step of providing a weighing bridge (1) having force measuring means (25) with two load cells; a second step of conveying a suspended item of poultry in a predefined path extending over the weighing bridge (1); a third step of transferring substantially the weight of the suspended item of poultry onto the weighing bridge; and a fourth step of reading out values detected by the load cells of the force measuring means (25); and calculating an actual weight using an average of the detected force values over a predetermined period of time. The apparatus includes components for carrying out the method.

20 Claims, 10 Drawing Sheets

(51) Int. Cl.
- *G01G 23/10* (2006.01)
- *A22C 21/00* (2006.01)
- *B07C 5/28* (2006.01)
- *B65G 47/86* (2006.01)
- *G01G 11/04* (2006.01)
- *G01G 15/00* (2006.01)
- *B65G 47/84* (2006.01)

(52) U.S. Cl.
CPC .............. *G01G 19/06* (2013.01); *B65G 47/842* (2013.01); *B65G 47/846* (2013.01); *B65G 47/847* (2013.01)

(56) References Cited

U.S. PATENT DOCUMENTS

| | | |
|---|---|---|
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,011,573 A | 3/1977 | Braico |
| 4,034,440 A | 7/1977 | van Mil |
| 4,096,950 A * | 6/1978 | Brook ........................... 209/593 |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,187,945 A * | 2/1980 | Altenpohl et al. ............ 209/592 |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,550,793 A * | 11/1985 | Giles ............................ 177/145 |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van den Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,709,770 A * | 12/1987 | Kohashi et al. ............... 177/50 |
| 4,723,339 A | 2/1988 | van den Nieuwelaar et al. |
| 4,724,581 A | 2/1988 | van den Nieuwelaar |
| 4,736,492 A | 4/1988 | Hazenbroek et al. |
| RE32,697 E | 6/1988 | Hazenbroek et al. |
| 4,754,822 A * | 7/1988 | Altenpohl et al. ............ 177/145 |
| 4,765,028 A | 8/1988 | van den Nieuwelaar et al. |
| 4,766,644 A | 8/1988 | van den Nieuwelaar et al. |
| 4,769,872 A | 9/1988 | Hazenbroek et al. |
| 4,770,260 A * | 9/1988 | Brook ........................... 177/145 |
| 4,779,308 A | 10/1988 | van den Nieuwelaar et al. |
| 4,788,749 A | 12/1988 | Hazenbroek et al. |
| 4,811,456 A | 3/1989 | Huevel |
| 4,811,458 A | 3/1989 | v. d. Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek et al. |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,951,763 A * | 8/1990 | Zimmerman et al. ......... 177/164 |
| 4,958,694 A | 9/1990 | van den Nieuwelaar et al. |
| 4,965,908 A | 10/1990 | Meyn |
| 4,971,177 A * | 11/1990 | Nojiri et al. ..................... 186/61 |
| 4,972,549 A * | 11/1990 | Van Den Nieuwelaar et al. ......... 452/178 |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van de Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |

(56) References Cited

U.S. PATENT DOCUMENTS

| | | |
|---|---|---|
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,549 A | 7/1995 | Verrijp et al. |
| 5,434,366 A * | 7/1995 | Troisi ............................... 177/52 |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,490,451 A | 2/1996 | Nersesian |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,576,520 A * | 11/1996 | Waterman et al. ............ 177/145 |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A | 2/1998 | Schoenmakers et al. |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A | 7/1998 | Hazenbroek et al. |
| 5,785,588 A | 7/1998 | Jacobs et al. |
| 5,803,802 A | 9/1998 | Jansen |
| 5,810,651 A | 9/1998 | De Heer et al. |
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,033,299 A | 3/2000 | Stone et al. |
| 6,062,972 A | 5/2000 | Visser |
| 6,084,184 A * | 7/2000 | Troisi ............................ 177/145 |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,530,466 B2 | 3/2003 | Murata et al. |
| 6,599,179 B1 | 7/2003 | Hazenbroek et al. |
| 6,612,919 B2 | 9/2003 | Janset et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,279,644 B1 * | 10/2007 | Kasel ...................... 177/25.13 |
| 7,284,973 B2 | 10/2007 | van Esbroeck et al. |
| 7,302,885 B2 | 12/2007 | Townsend |
| 7,344,437 B2 | 3/2008 | Van Den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 2001/0023114 A1 | 9/2001 | Hazenbroek et al. |
| 2002/0020568 A1 * | 2/2002 | Brook ......................... 177/145 |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van Den Nieuwelaar et al. |

(56) References Cited

U.S. PATENT DOCUMENTS

| | | |
|---|---|---|
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |
| 2013/0196584 A1* | 8/2013 | van den Berg et al. ....... 452/188 |

FOREIGN PATENT DOCUMENTS

| | | |
|---|---|---|
| EP | 1 353 155 A1 | 10/2003 |
| EP | 1 440 618 | 7/2004 |
| EP | 1 538 113 A1 | 6/2005 |
| EP | 2 181 841 A1 | 5/2010 |
| FR | 2 529 177 A1 | 12/1983 |
| GB | 1 395 722 A | 5/1975 |
| WO | WO 02/44670 A1 | 6/2002 |

OTHER PUBLICATIONS

Written Opinion—NL 2004574, Publication Date Jan. 3, 2011, Foodmate B.V.

PCT/NL2011/050267—International Preliminary Report on Patentability, Publication Date Oct. 23, 2012, Foodmate B.V.

International Search Report & Written Opinion—PCT/NL2013/050434, Publication Date Aug. 14, 2013, Foodmate B.V.

Search Report in Netherlands Application No. 2006075 dated Jan. 12, 2011.

Office Action in EP Application No. 12 703 612.7 dated May 26, 2014.

* cited by examiner

WEIGHING METHOD AND APPARATUS FOR MEAT PROCESSING SYSTEMS

TECHNICAL FIELD

The invention relates to a weighing apparatus for use in conjunction with meat processing equipment or systems. In particular the invention relates to such a weighing apparatus that are provided in conveyers for weighing items of poultry during their travel along the conveyer of meat processing systems, so that weighing can be performed without interruption of travel.

BACKGROUND

Weighing apparatus are known, amongst others, from prior art patent documents U.S. Pat. No. 1,902,512, GB 1481495, U.S. Pat. Nos. 3,622,000, and 4,187,945. In these prior art systems generally an overhead conveyer track has a section associated therewith that is independently movable relative to the majority of the overhead track. Weighing devices are operatively connected to the independently movable section. Shackle assemblies for supporting bird or poultry carcasses are suspended for movement along the overhead track by carriers. Each shackle comprises an upper portion, including the carrier, and a lower portion that is relatively movable with respect to the upper portion. The lower portion includes a hook formation for holding a poultry carcass and a supporting slider or wheel for engaging a weighing platform of the independently movable section. When the lower portion of the shackle has engaged the weighing platform, it has slightly been lifted to transfer its entire weight onto the weighing platform, while the upper portion of the shackle remains suspended from the overhead track as the shackles travel therealong.

It is also common for such weighing apparatus either to be associated with a circular conveyer path, as additionally shown by U.S. Pat. No. 4,300,644, or with a linear conveyer path as shown by U.S. Pat. No. 5,037,351. It has also been practised to combine such weighing apparatus with transfer stations that transfer chicken or poultry carcasses from one processing line to a subsequent processing line. A transfer station in general is described in patent document U.S. Pat. No. 6,905,404, and although this does not disclose a weighing apparatus combined therewith, it is known that various suppliers, such as Linco and Meyn, offer such transfer stations.

The existing devices are critical with respect to their operating speed. As the speed is increased the reliability and accuracy of the measured weight tends to be compromised. Now that the operating speeds of meat processing systems is continuingly increasing, the weighing apparatus are more and more becoming a limiting element to the operating speed of processing lines. There thus has arisen a need for weighing apparatus that operate with greater accuracy and reliability at an increased speed.

Accordingly it is an aspect of the present invention to propose an improved weighing apparatus for use in conjunction with meat processing equipment or systems, which measures weight more accurately and allows an increased conveyer speed. In a more general sense it is an object of the present invention to at least overcome or ameliorate one or more of the disadvantages of the prior art. It is also an object of the present invention to at least provide alternative structures which are less cumbersome in manufacture and use and which can be made and used relatively inexpensively. At any rate the present invention is at the very least aimed at offering a useful alternative and contribution to the existing art.

SUMMARY

To this end the present invention provides an improved weighing method and apparatus as defined in the appended claims. Such an improved weighing method and apparatus allows to measure weight more accurately and allows to match increased conveyer speeds of present day meat processing systems.

Further advantageous aspects of the invention will become clear from the appended description and in reference to the accompanying drawings, which are briefly described as follows.

DETAILED DESCRIPTION

Figure 1:
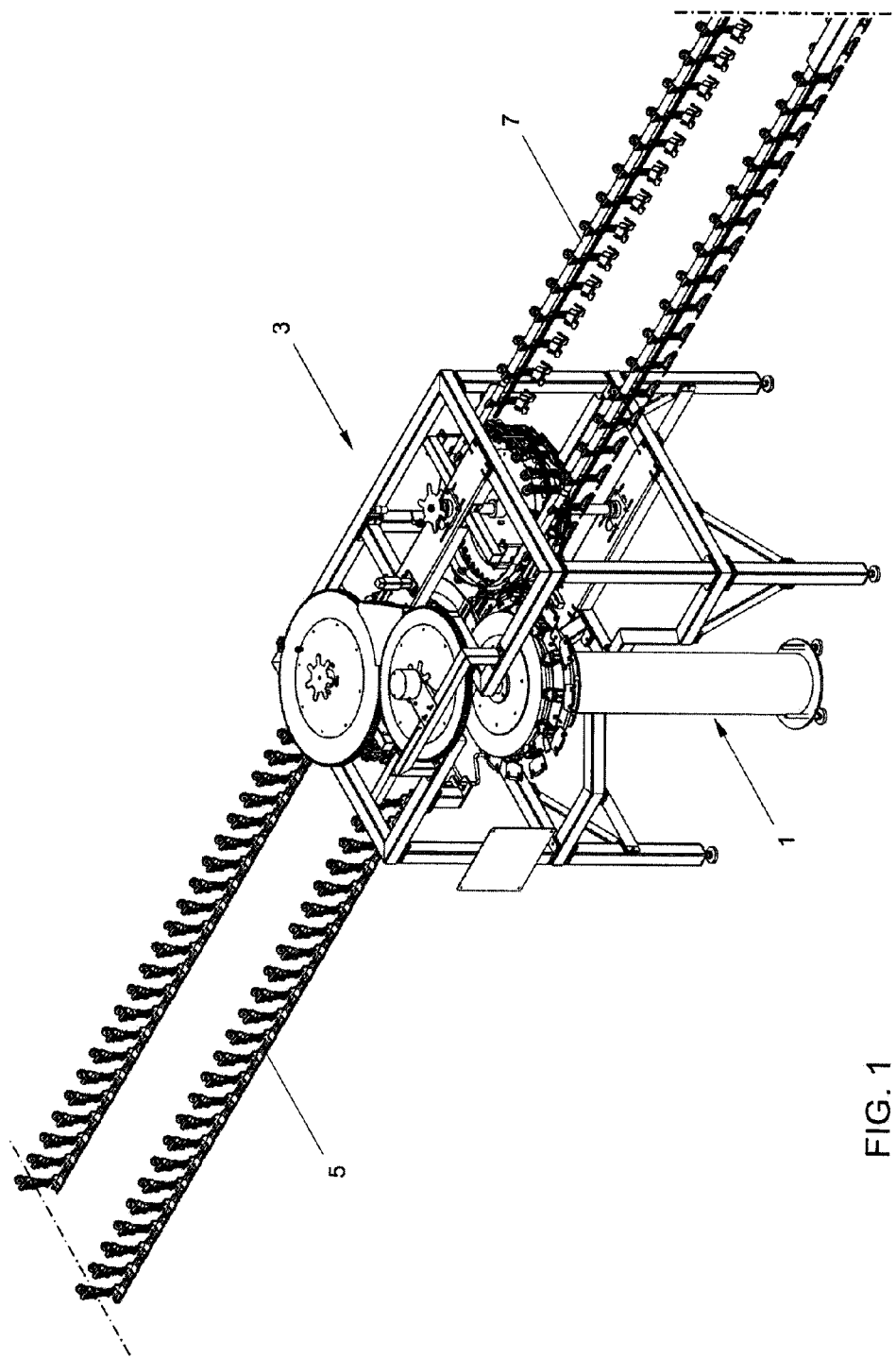
FIG. 1 is in a perspective view of a transfer station, including a weighing apparatus according to the invention; positioned between a first and a second conveyor line.
Figure 2A:
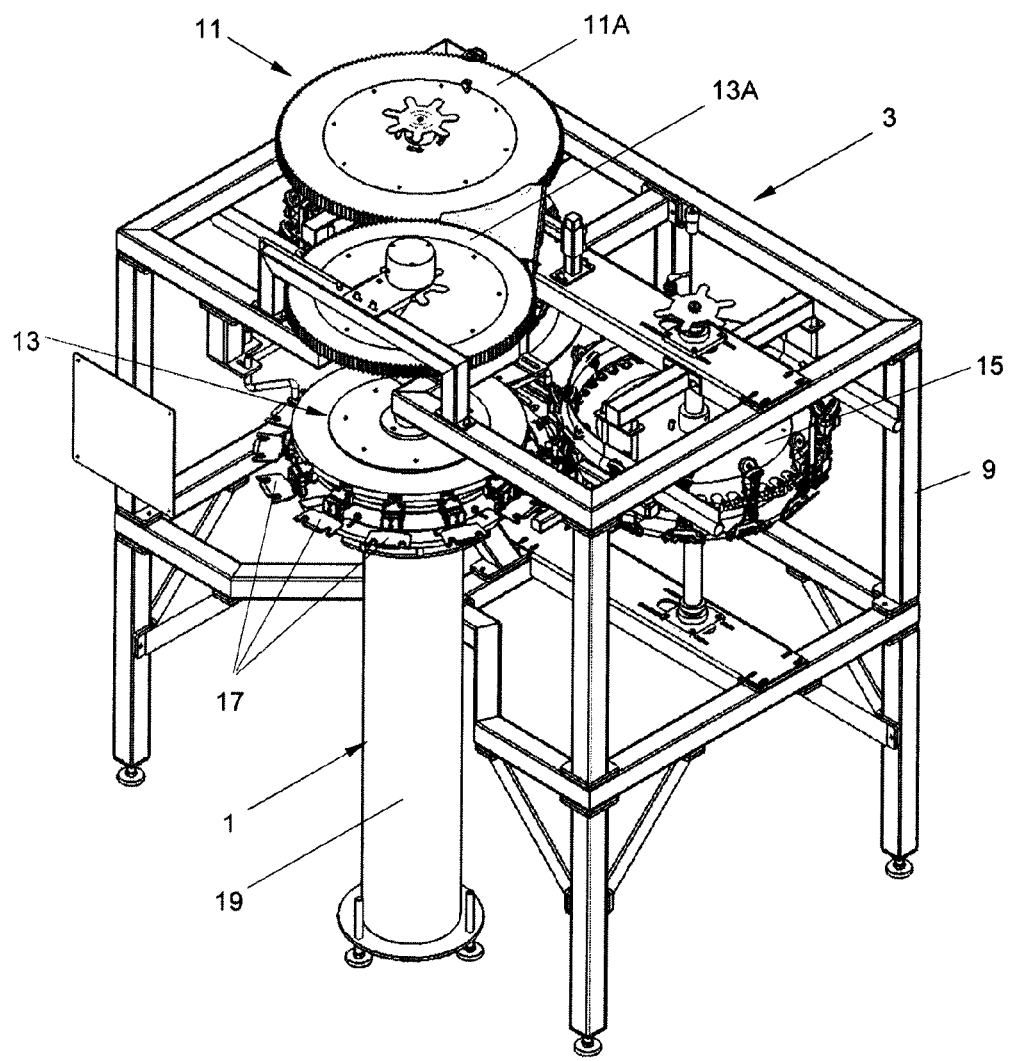
FIGS. 2A, 2B, 2C are a perspective view, a top plan view, and a front elevation of the transfer station of FIG. 1 respectively.
Figure 2B:
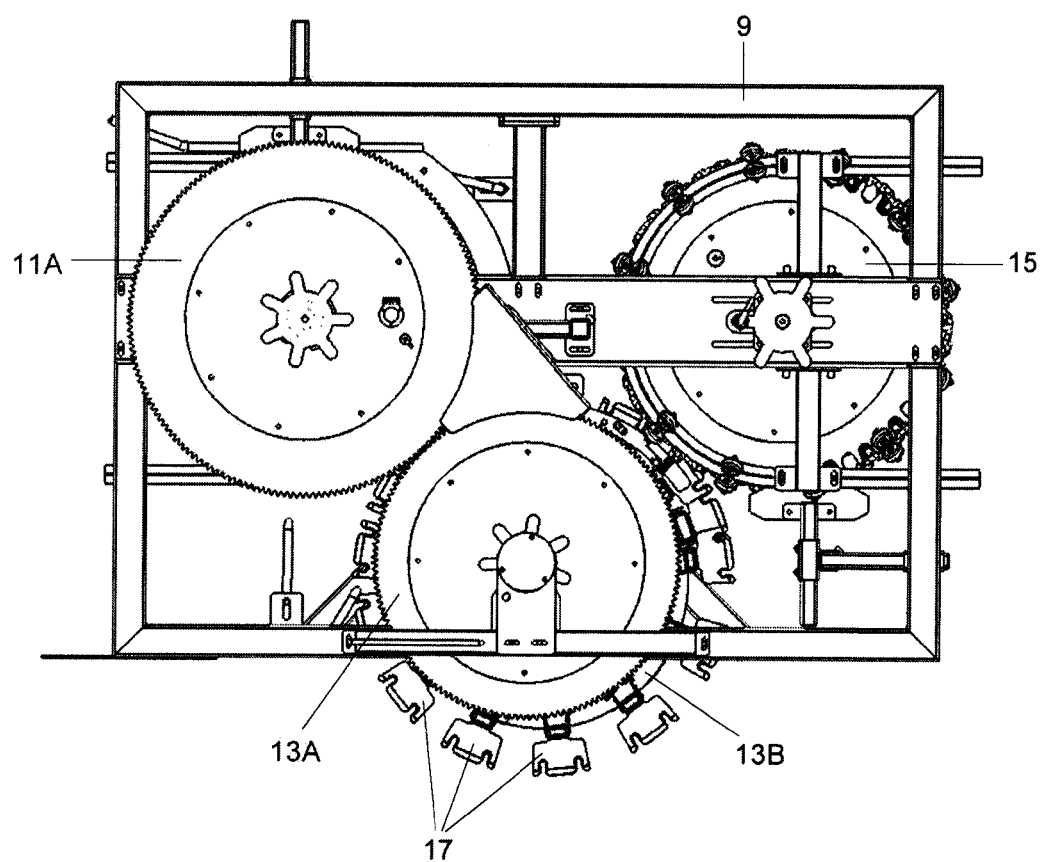
Figure 2C:
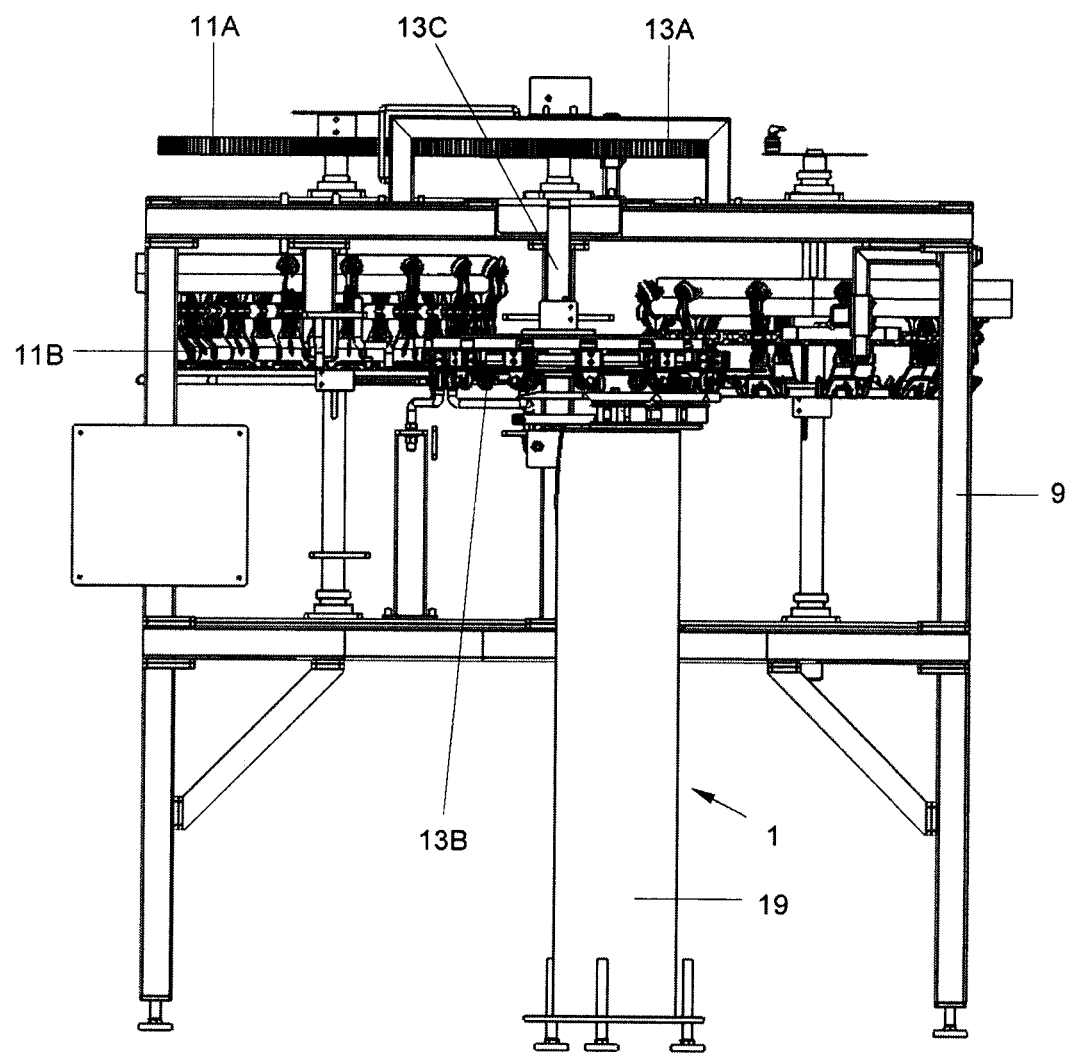
Figure 3:
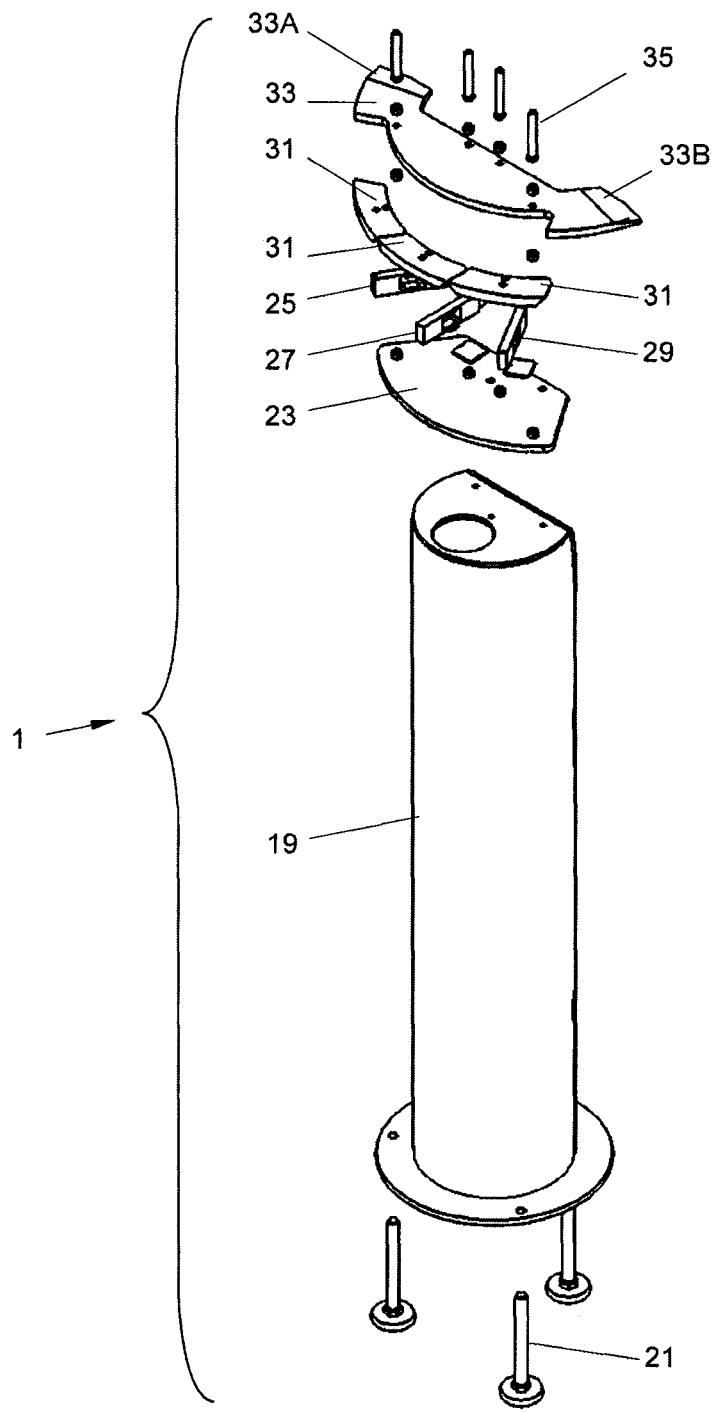
FIG. 3 is an exploded view of a weighing bridge, as included in the transfer station of FIGS. 1 and 2.

In FIG. 1 a weighing bridge 1 is shown as part of a transfer station 3 that transfers suspended poultry carcasses from a first treatment line 5 to a second treatment line 7. The transfer station 3 is shown in greater detail in FIG. 2A and includes a frame 9 on which a receiving wheel assembly 11 is rotatably mounted. The receiving wheel assembly 11 is driving a weighing wheel assembly 13 also mounted on the frame 9 by means of a receiving wheel gear 11A driving a weighing wheel gear 13A. Further mounted on the frame 9 for rotation is a dispatch wheel 15 which is part of the second treatment line 7. As better seen in the front elevation of FIG. 2C, the weighing wheel assembly 13 also includes a weighing wheel 13B, which is suspended from the weighing wheel gear 13A by a drive shaft 13C. The weighing wheel 13B comprises a plurality of hook units 17 (FIG. 2B). The weighing unit 1 has a support column 19, which is completely independent from the frame 9, but is supported from the same ground level. The support column 19 of the weighing bridge 1, as seen in FIG. 3, has adjustable feet 21 to support it from the ground level or floor. The column 19 is preferably filled with a heavy material, such as sand or concrete, to increase its weight and thereby reduce its sensitivity to vibrations. At an upper end of the support column 19 a supporting plate 23 is attached that supports first, second, and third load cells 25, 27, 29. Each first, second, and third load cell 25, 27, 29 is associated with a weighing block segment 31. The weighing block segments 31, upon assembly of the weighing bridge 1, are substantially flush with a weighing platform guide 33. The weighing platform guide 33 has opposite first and second ramps 33A, 33B. Fasteners 35 are used to hold the assembly of the weighing bridge 1 together.

Figure 4:
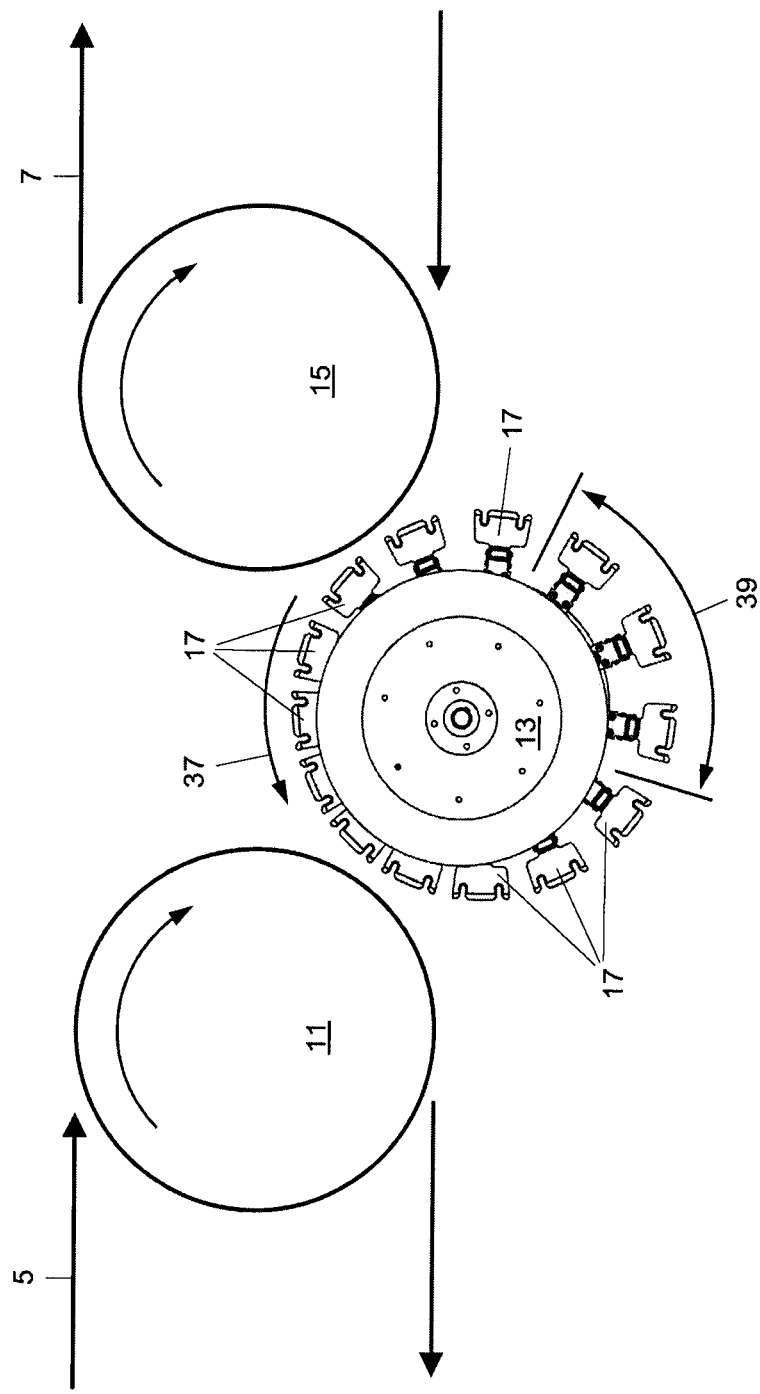
FIG. 4 is a schematic top view of the transfer station with a weighing wheel of the weighing apparatus shown in somewhat greater detail.
Figure 5C:
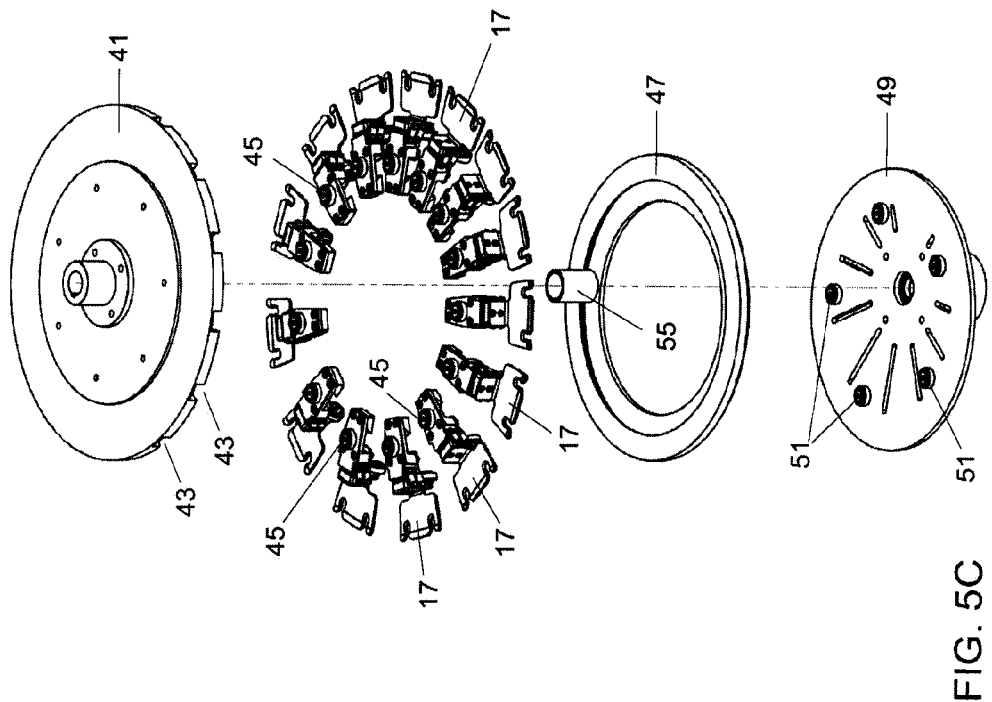
FIG. 5C is an exploded view of the weighing wheel.
Figure 5A:
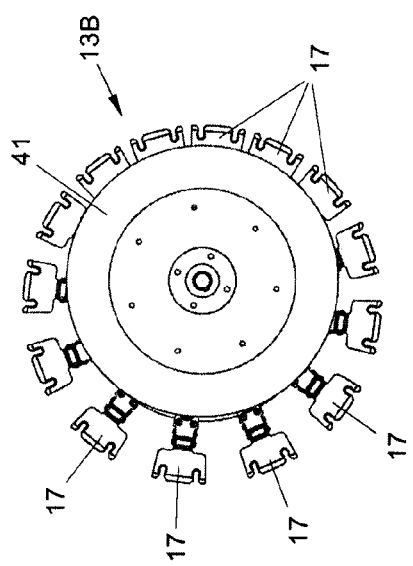
FIG. 5A is a top plan view of the weighing wheel.

The transfer station 3 may be further explained in reference to the schematic top view of FIG. 4. Chicken or poultry carcasses are supplied to the receiving wheel assembly 11 by an overhead conveyor of a first treatment line 5. The individual spacing between successive carcasses in the first treatment line 5 may be 6 inches, or 152 mm. After transfer via the weighing wheel assembly 13 and the dispatch wheel 15, the individual spacing between the carcasses may be 8 inches, or 203 mm. For accurately measuring the weight of the individual carcasses it is preferred for the distance between adjacent carcasses to be increased to at least 10 inches, or 254 mm. This is accomplished as shown in FIG. 4 by varying the spacing of the individual hook units 17 while these are rotated in the direction of arrow 37. By varying the distance of the hook units 17 between 6 inches and 10 inches there are created around the circumference of the weighing wheel assembly 13 an area where the spacing corresponds to the receiving wheel 11, an area where the spacing corresponds to the dispatch wheel 15, and an area indicated by arrow 39 where the spacing is optimal for weighing the individual carcasses. To achieve this effect the weighing wheel 13B is constructed as shown in FIGS. 5A and 5C. As seen in the exploded arrangement of FIG. 5C, a drive wheel 41 that is driven by the shaft 13C (FIG. 2C). The drive wheel 41 on its lower side has a plurality of radial grooves 43, the number of which corresponds to the number of hook units 17. Each hook unit 17 has an upper first guide roller 45 engaged in a relevant one of the radial grooves 43. A guide ring 47 slidably engages the hook units 17 on a lower side. The guide ring 47 is rotatably retained on a stationary lower bearing plate 49 by means of rollers 51 engaging the guiding ring's 47 inner opening contour 53. In this example the guide ring 47 is a strictly circular ring, but other contours may be selected when a need arises. A distance collar 55 may be interposed between the drive wheel 41 and the lower bearing plate 49 to ensure that hook units 17 may freely move inwardly and outwardly with respect to the drive wheel 41 and about the bearing plate 49.

Figure 6A:
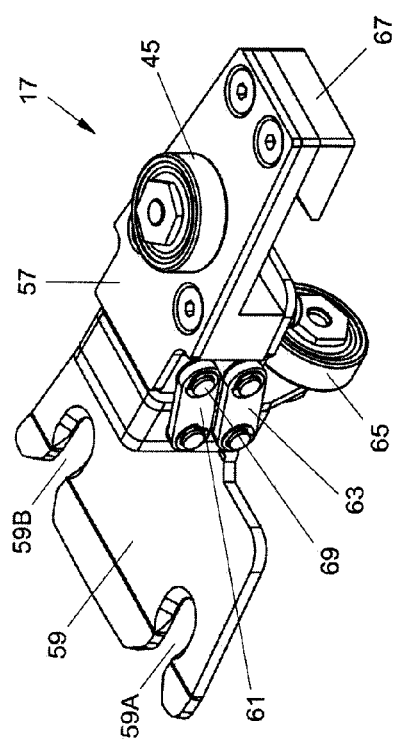
FIG. 6A is a perspective view of the weighing hook unit that forms part of the weighing wheel.
Figure 6C:
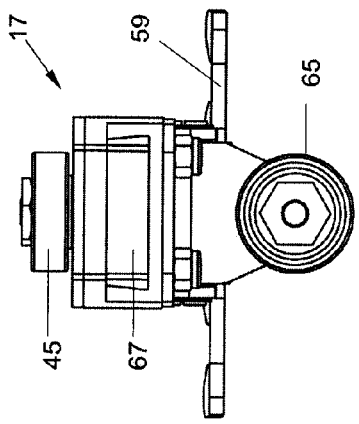
FIG. 6C is a rear elevation of the weighing hook unit of FIG. 6B.
Figure 6B:
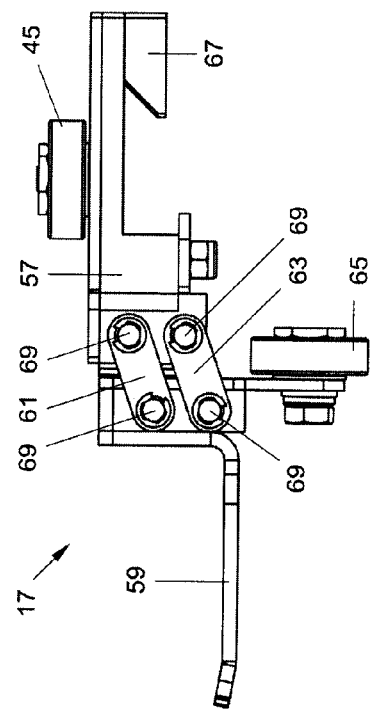
FIG. 6B is a side elevation of the weighing hook unit of FIG. 6B.

The hook units 17 will now be described in reference to FIGS. 6A-6C. Hook unit 17 includes a body part 57 which carries the upper guide roller 45. The hook unit 17 further includes a shackle part 59 that is vertically moveable with respect to the body part 57 through pairs of parallel links 61, 63 pivotally mounted from pivot pins 69 on opposite sides. The shackle part 59 has slots 59A, 59B for receiving the legs of a poultry or chicken carcass, and on a lower side has a lower second guide roller 65. The lower guide roller 65 is adapted to engage the weighing platform guide 33 of the weighing bridge 1 (FIG. 3); and thereby lift the shackle part 59 free of the body part 57. As illustrated in FIGS. 6A, 6B the shackle part 59 is not lifted and has its own weight as well as that of a suspended poultry carcass directly supported from the body part 57. A guide block 67 is removably attached to the body part 57 to slidably attach over the guide ring 47.

Figure 5B:
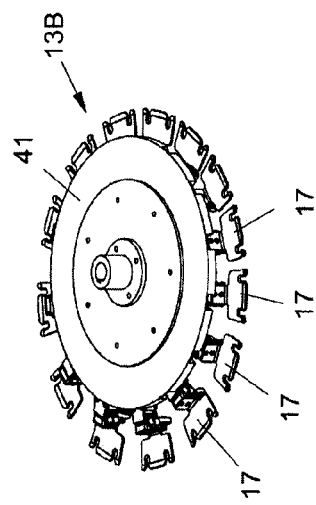
FIG. 5B is a perspective view of the weighing wheel.
Figure 7:
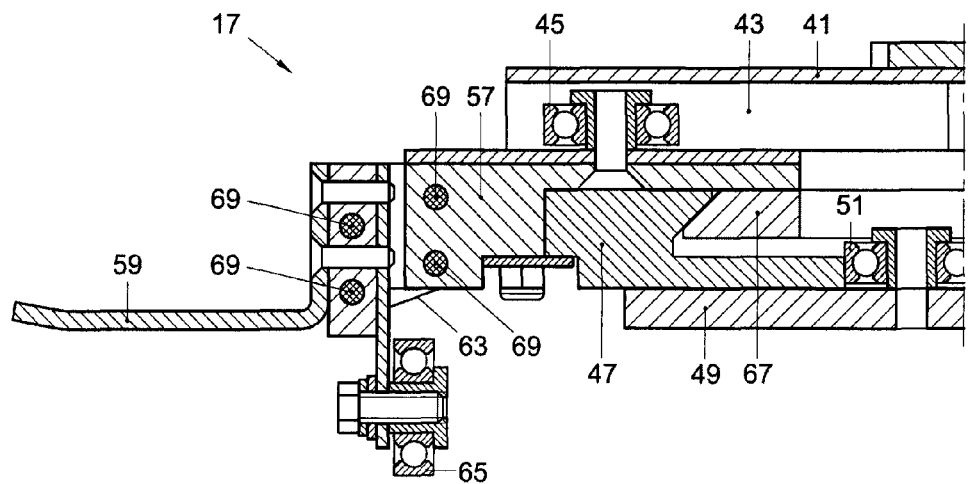
FIG. 7 is a partial cross section of the weighing wheel taken over a weighing hook unit.

For an explanation of the co-operation between the hook unit 17 and the guiding ring 47 reference can be made to FIG. 7, which is a partial cross section over a weighing hook unit 17 at the weighing wheel 13B. In conjunction with FIGS. 5A-5C it will be appreciated that the guide ring 47 by means of the stationary lower bearing plate 49 is arranged eccentrically with respect to the drive wheel 41. The guide ring 47 thereby urges the hook units 17 inwardly and outwardly when the drive wheel 41 rotates and the upper guide rollers 45 are guided in a radial direction of the drive wheel 41 by one of the radial grooves 43. The guide block 67 retains the body part 57 in engagement with the guide ring 47. The parallel links, only one of which 63 is visible in FIG. 7, allow the shackle part 59 with a rear face to rest against a first fact of the body part 57 and thereby support the weight of a suspended poultry carcass from the body part 57 and the lower bearing plate 49. When the loser guide roller 65 engages a first ramp 33A of the weighing platform guide 33 the shackle part 59 is lifted free from the body part 57 as the parallel links 61, 63 are allowed to swing about the relevant pivot pins 69.

Figure 8:
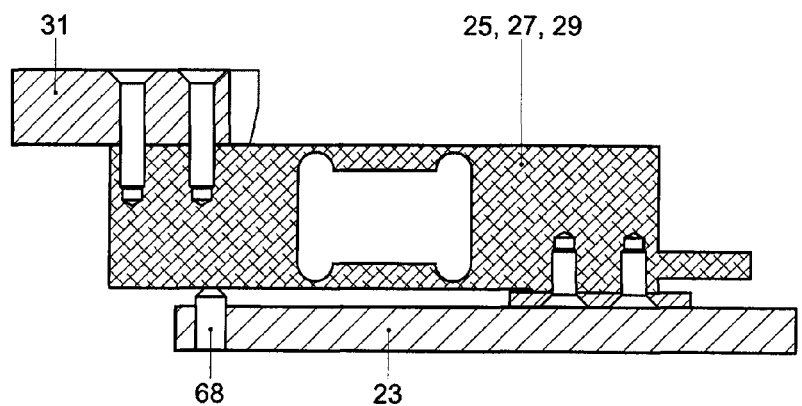
FIG. 8 is a partial cross section of a load cell as mounted in the weighing bridge of FIG. 3.

The weighing bridge 1 as already briefly referred to in connection with FIG. 3, will now be explained in more detail. FIG. 8 shows one of the three identical load cells 25, 27, 29 that are mounted on the supporting plate 23. At a free end of the load cell 25, 27, 29, one of the block segments 31 is attached. The blocks segments 31 are arranged in a cut out portion of the weighing platform guide 33 (FIG. 3), so that the lower guide rollers 65 of the shackle parts 59 will ride over the block segments 31, one after the other, while the weighing hook units 17 are moved over the platform guide 33. The weighing of the poultry carcasses takes place at the weighing bridge 1, after one of the hook units 17 is engaged with the platform guide 33 and has its shackle part 59 lifted by the first ramp 33A and when the lower roller 65 engages the successive block segments 31 of the individual first, second and third load cells 25, 27, 29. Several variations of load cells are commercially available for measuring weights. For this application a so-called single-point load cell is preferred. Such a single-point load cell measures the lateral force rather than torque, and is thereby less critical as to where the force to be measured is applied. The selected type of load cell for the first, second and third load cells, 25, 27, 29 is a Model 1042 low profile aluminium load cell of Tedea-Huntleigh. The maximum deflection of the free end of each load cell 25, 27, 29 is limited by an adjustment screw 68.

Figure 9:
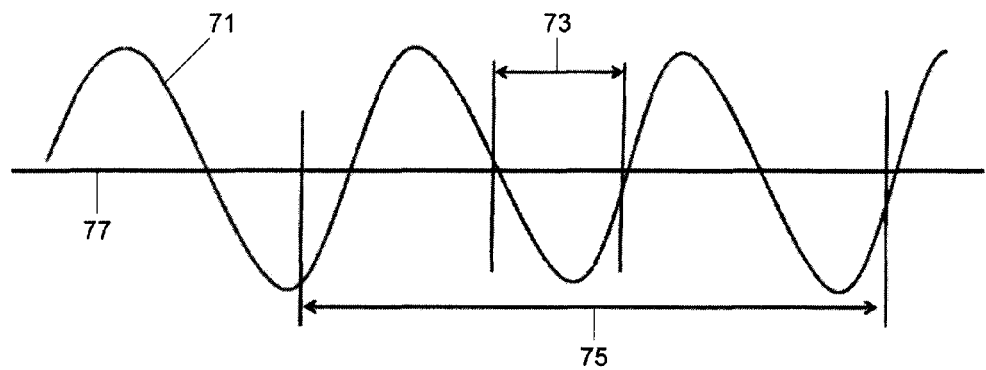
FIG. 9 is a schematic illustration showing the effect that low frequency vibrations may have on relatively short and relatively long weighing paths.

The arrangement of three successive load cells 25, 27, 29 enables to increase the weighing time for each carcass. An increased weighing time allows the accuracy of the measurement to be increased. This is important in view of vibrations that occur in meat processing lines. While it is possible to reduce the effect of high frequency vibrations by electronic means or by software, this is not possible with low frequency vibrations. In FIG. 9 it is explained how a longer weighing time can reduce the effect of low frequency vibrations. The measured weight 71 is represented as a sinus-like alternating value about the actual weight, as can be caused by low frequency vibrations. At 73 an example is given of a short measuring distance. Because in this example only a negative amplitude of the measured weight 71 is encompassed by the short measuring distance 73, an average weight that is calculated from this measurement will clearly be too low. From another example of a relatively long measuring distance 75 in FIG. 9 it is clear that several amplitudes of the measured weight 71 can be encompassed, and that a calculated average will be a much more accurate representation of the actual weight 77.

Figure 10:
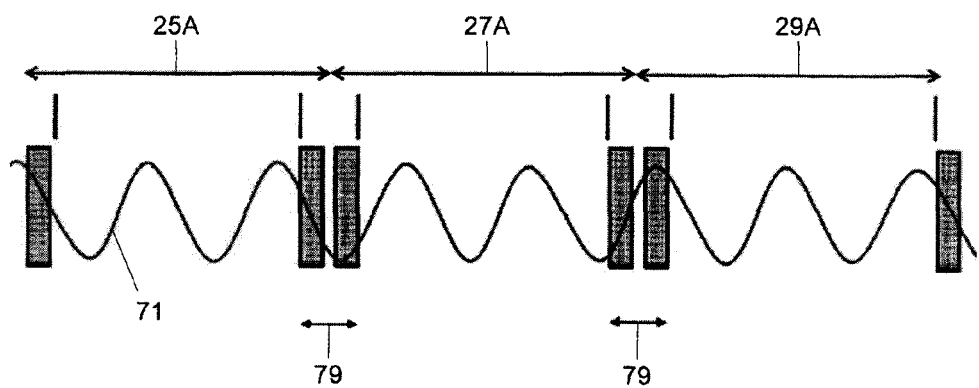
FIG. 10 is a schematic illustration showing the measurement with three successive load cells as practised by the present invention.

Referring now to FIG. 10, the measurement with three successive load cells is schematically represented. The block segments 31 are so formed that there is a gradual transition for the lower guide roller 65 from one block segment to the other. As seen in FIG. 3 the lines of separation between the block segments 31 are not strictly radial, but slightly inclined to the radial, so that the guide roller 65 can not be caught in a recess that is formed between the segments. Due to this inclined transition between the segments 31 some measuring time is lost as illustrated at 79 in FIG. 10. So as not to lose too much measuring time, the inclination of the separation line between successive segments 31 is preferably chosen not to exceed 45° to the radial direction As seen in FIG. 10, the measured weight of each load cell has a sufficiently long duration 25A, 27A, 29A to ensure that at least two amplitudes of the measured weight 71 are encompassed. By also averaging the measurement of these successive load cells 25, 27, 29 it has been found that the influences of low frequency vibrations can be successfully eliminated. Also the through part of the measuring device 1 can be increased to match those of meat processing lines that operate at an increased speed. Upon calculation of the actual weight from averaging the successive measuring steps, the weighing apparatus 1 can be further arranged to identify the position of the weighed item of poultry with respect to a path of conveyance leading from the weighing bridge 3 and storing the calculated weight in respect thereof for subsequent monitoring. Such a feature will enable sorting and/or distribution of the weighed items of poultry between different meat processing lines, according to pre-defined weight ranges.

Accordingly there is described a method of, as well as an apparatus for, weighing items of poultry in conjunction with meat processing systems (first treatment line 5, second treatment line 7). The method includes: a first step of providing a weighing bridge (1) having force measuring means (first load cell 25); a second step of conveying a suspended item of poultry in a predefined path extending over the weighing bridge (1); a third step of transferring substantially the weight of the suspended item of poultry onto the weighing bridge (1); and a fourth step of reading out values detected by the force measuring means (first load cell 25) and calculating an actual weight using an average of the detected force values over a predetermined period of time. The method in particular further comprises providing first and second, as well as possibly third, successive load cells (25, 27; 29) in the measuring means and calculating the actual weight as an average of at least both load cell measurements.

The weighing apparatus as described includes: a conveyer section (weighing wheel assembly 13); a plurality of hook units (17) associated with the conveyer section (13), each hook unit (17) having a body part (57) connected to the conveyer section (13) for movement thereby through a predefined path and a shackle part (59) movable relative to the body part (57) for supporting an item of poultry; and a weighing bridge (1) comprising a frame (support column 19), a weighing platform (weighing block segments 31, weighing platform guide 33), as well as at least a first load cell (25) for measuring weight of an item of poultry suspended from the shackle part (59) of each hook unit (17) passing over the weighing bridge (1). The weighing apparatus has a second, as well as an optional third, load cell (27; 29) associated with the weighing platform (31, 33) to measure the weight of an item of poultry suspended from the shackle part of each hook unit (17) in succession to the first load cell (25).

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention without affecting its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

What is claimed is:

1. A weighing apparatus for use in conjunction with a meat processing system, for determining the weight of items of poultry during their travel along a conveyer of the meat processing system while minimizing inaccuracies in the determined weight of each item caused by vibrations of the system having a predetermined vibration frequency, the weighing apparatus including:
   a conveyer section;
   a plurality of hook units associated with the conveyer section, each hook unit having a body part connected to the conveyer section for movement thereby through a predefined path and a shackle part movable relative to the body part for supporting an item of poultry;
   a weighing bridge comprising a frame, a weighing platform, and a first load cell for measuring weight of an item of poultry suspended from the shackle part of each hook unit passing over the weighing bridge; and
   a second load cell associated with the weighing platform to measure the weight of an item of poultry suspended from the shackle part of each hook unit in succession to the first load cell;
   a first support structure coupled to the first load cell and a second support structure coupled to the second load cell, the first and second support structures being configured to ensure that each load cell measures the weight of an item of poultry passing over the weighing bridge for a duration sufficient to encompass at least two amplitudes of the predetermined vibration frequency;
   the determined weight of an item of poultry being calculated as an average of both load cell measurements.

2. Weighing apparatus according to claim 1, wherein the frame is supported independently from any meat processing system in conjunction with which it is to be used.

3. Weighing apparatus according to claim 1 further comprising a third load cell associated with the weighing bridge to measure the weight of an item of poultry suspended from the shackle part of each hook unit in succession to the first and second load cells and a support structure coupled to the third load cell ensuring that the third load cell measures the weight of an item of poultry passing over the weighing bridge for a duration sufficient to encompass at least two amplitudes of the predetermined vibration frequency, and wherein the determined weight is calculated as an average of all the load cell measurements.

4. Weighing apparatus according to claim 1, further comprising a weighing wheel assembly as part of the conveyer section, the weighing wheel assembly including a drive wheel with a plurality of radial grooves, and a stationary bearing plate holding a guide ring eccentrically positioned with respect to the drive wheel, wherein the plurality of hook units each have a first guide roller on their body part engaged in one of the plurality of radial grooves and a guide block of the body part engaging the guide ring.

5. Weighing apparatus according to claim 4, wherein the guide ring is rotatably held on the stationary bearing plate by rollers engaging an inner contour of the guide ring.

6. Weighing apparatus according to claim 1 wherein the weighing platform includes a platform guide with opposite first and second ramps for lifting an engaging shackle part and wherein the first and second support structures comprise weighing segments connected to free ends of the first and second load cells.

7. Weighing apparatus according to claim 6, wherein the weighing segments are separated from one another by a transitional gap extending in a direction inclined with respect to a direction perpendicular to the predefined path of movement of the hook units.

8. Weighing apparatus according to claim 1 wherein each shackle part has a second guide roller for engaging the weighing bridge.

9. Weighing apparatus according to claim 1, wherein the shackle part is movably connected to the body part by pairs of parallel links swivably mounted on pivot pins.

10. Weighing apparatus according to claim 1, wherein deflection of each load cell is limited by an adjustment screw.

11. Weighing apparatus according to claim 1 wherein the frame is a support column filled with a heavy material.

12. A transfer station for transferring items of poultry from a first processing line to a second processing line in meat processing systems, the transfer station including the weighing apparatus of claim 1, wherein a delivery end of an overhead conveyer track of the first processing line and a receiving end of an overhead track of the second processing line are connected to the transfer station, the transfer station and communicate through the weighing apparatus.

13. Transfer station according to claim 12, wherein a first spacing between individual items of poultry on the first processing line differs from a second spacing between the individual items of poultry on the second processing line, and wherein the weighing apparatus varies the distance of the hook units in the predefined path to accommodate the first spacing, the second spacing, as well as a third spacing optimal for weighing.

14. Transfer station according to claim 12 wherein the second processing line is a continuation of the first processing line.

15. Method of weighing items of poultry in a weighing apparatus, including:
  a first step of obtaining a weighing bridge having force measuring means;
  a second step of conveying a suspended item of poultry in a predefined path extending over the weighing bridge;
  a third step of transferring substantially the weight of the suspended item of poultry onto the weighing bridge; and
  a fourth step of receiving values detected by the force measuring means and calculating a determined weight using an average of the detected force values over a duration encompassing at least two amplitudes of a predetermined vibration frequency, wherein the method further comprises providing first and second successive load cells in the measuring means and calculating the actual weight as an average of both load cell measurements.

16. Method according to claim 15, further comprising providing a third successive load cell in the measuring means and calculating the actual weight as an average of all the load cell measurements.

17. Method according to claim 15 further including a fifth step of identifying the position of the weighed item of poultry with respect to a path of conveyance leading from the weighing bridge and storing the calculated weight in respect thereof for subsequent monitoring.

18. A weighing apparatus for use in conjunction with a meat processing systems, for weighing items of poultry during their travel along a conveyer of the meat processing system, the weighing apparatus including:
  a conveyer section;
  a plurality of hook units associated with the conveyer section, each hook unit having a body part connected to the conveyer section for movement thereby through a predefined path and a shackle part movable relative to the body part for supporting an item of poultry;
  a weighing bridge comprising a frame, a weighing platform, and a first load cell for measuring weight of an item of poultry suspended from the shackle part of each hook unit passing over the weighing bridge;
  a second load cell associated with the weighing platform to measure the weight of an item of poultry suspended from the shackle part of each hook unit in succession to the first load cell, and wherein the actual weight is calculated as an average of both load cell measurements;
  a weighing wheel assembly as part of the conveyer section, the weighing wheel assembly including a drive wheel with a plurality of radial grooves, and a stationary bearing plate holding a guide ring eccentrically positioned with respect to the drive wheel, wherein the plurality of hook units each have a first guide roller on their body part engaged in one of the plurality of radial grooves and a guide block of the body part engaging the guide ring.

19. Weighing apparatus according to claim 18, wherein the guide ring is rotatably held on the stationary bearing plate by rollers engaging an inner contour of the guide ring.

20. A weighing apparatus for use in conjunction with a meat processing systems, for weighing items of poultry during their travel along a conveyer of the meat processing system, the weighing apparatus including:
  a conveyer section;
  a plurality of hook units associated with the conveyer section, each hook unit having a body part connected to the conveyer section for movement thereby through a predefined path and a shackle part movable relative to the body part for supporting an item of poultry;
  a weighing bridge comprising a frame, a weighing platform, and a first load cell for measuring weight of an item of poultry suspended from the shackle part of each hook unit passing over the weighing bridge, the frame comprising a support column filled with a heavy material; and
  a second load cell associated with the weighing platform to measure the weight of an item of poultry suspended from the shackle part of each hook unit in succession to the first load cell, and wherein the actual weight is calculated as an average of both load cell measurements.

* * * * *